United States Patent
Swartling (10) Patent No.: US 9,783,217 B2
(45) Date of Patent: Oct. 10, 2017

(54) HAND-OPERATED AND ROLLING DEVICE FOR LIFTING AND MOVING PALLETS WITH LIFTING EFFECT BY WHEEL CAMBER CHANGE

(71) Applicant: Pallea AB, Västerås (SE)

(72) Inventor: Mikael Swartling, Västerås (SE)

(73) Assignee: Pallea AB, Vasteras (SE)

(*) Notice: Subject to any disclaimer, the term of this patent is extended or adjusted under 35 U.S.C. 154(b) by 0 days.

(21) Appl. No.: 14/902,081

(22) PCT Filed: Apr. 16, 2014

(86) PCT No.: PCT/EP2014/057809
§ 371 (c)(1),
(2) Date: Dec. 30, 2015

(87) PCT Pub. No.: WO2015/000615
PCT Pub. Date: Jan. 8, 2015

(65) Prior Publication Data
US 2016/0368517 A1  Dec. 22, 2016

(30) Foreign Application Priority Data
Jul. 5, 2013  (EP) ..................................... 13175344

(51) Int. Cl.
B62B 3/06  (2006.01)
(52) U.S. Cl.
CPC .......... B62B 3/0606 (2013.01); B62B 3/0625 (2013.01); B62B 2203/20 (2013.01)
(58) Field of Classification Search
CPC .... B62B 3/0625; B62B 5/0083; B62B 5/0089
See application file for complete search history.

(56) References Cited

U.S. PATENT DOCUMENTS 3,143,358 A * 8/1964 Du Broff .............. B62B 3/0625
280/43.12
3,480,292 A  11/1969 Borkey
(Continued)

FOREIGN PATENT DOCUMENTS

CA  2138713 A1  6/1996
CN  101758845 A  6/2010
(Continued)

OTHER PUBLICATIONS

Office Action in Japanese Patent Application No. 2016-522344 dated Oct. 6, 2016.
(Continued)

Primary Examiner — Bryan Evans
(74) Attorney, Agent, or Firm — Kim Winston LLP (57) ABSTRACT

The present invention relates to a hand-operated device for lifting and moving pallets. The device comprises a framework including a first and a second fork (1, 2) projecting forwardly from the framework, each fork having a top surface (6) adapted to be in contact with the pallet, a handle (7) connected to the framework for applying manual force to the framework, support members (8a-d) connected to the framework for supporting the framework from the ground, and a first leg (3) having an upper end operatively connected to the handle and a lower end connected to the first fork to form a first frame element (10), and a second leg (4) having an upper end operatively connected to the handle and a lower end connected to the second fork to form a second frame element (12). Each of the first and second frame elements is arranged pivotable about an axis in parallel with the longitudinal axis ($L_1$, $L_2$) of the respective fork such that the framework is allowed to pivot between a first position for transporting the pallet and a second position for positioning the forks under the pallet, and the forks and support members are designed such that the vertical distance ($h_1$, $h_2$)

(Continued)

between the highest point of the top surface of the forks and the lowest point of the corresponding support members is shorter in the second position than in the first position, and by that the fork and the support member of each frame element form a lever for lifting and lowering the pallet.

17 Claims, 9 Drawing Sheets

(56) References Cited

U.S. PATENT DOCUMENTS

| | | | |
|---|---|---|---|
| 3,982,767 A | 9/1976 | Larsson | |
| 5,403,024 A | 4/1995 | Frketic | |
| 2002/0172581 A1* | 11/2002 | Maney | B60R 9/06 414/462 |

FOREIGN PATENT DOCUMENTS

| | | | |
|---|---|---|---|
| CN | 201721479 | | 1/2011 |
| EP | 2397388 | A3 | 12/2011 |
| FR | 1502267 | A | 11/1967 |
| FR | 2698063 | A1 | 5/1994 |
| GB | 804091 | | 11/1958 |
| WO | 9411229 | A1 | 5/1994 |
| WO | 2009117984 | A1 | 10/2009 |

OTHER PUBLICATIONS

Office Action in Chinese Patent Application No. 201480038633.X. dated Jul. 6, 2016.
Office Action in Japanese Patent Application No. 2016-522344dated Jun. 21, 2016.
International Search Report and Written Opinion for PCT/EP2014/057809 dated Jul. 16, 2014.

* cited by examiner

HAND-OPERATED AND ROLLING DEVICE FOR LIFTING AND MOVING PALLETS WITH LIFTING EFFECT BY WHEEL CAMBER CHANGE

CROSS-REFERENCE TO RELATED APPLICATIONS

This application is a U.S. national phase application under 35 U.S.C. §371 of International Application No. PCT/EP2014/057809 filed on Apr. 16, 2014 which claims priority to European Patent Application No. 13175344.4 filed Jul. 5, 2013, the entire disclosures of which are hereby incorporated by reference in their entirety.

FIELD OF THE INVENTION

The present invention relates to a hand-operated device for lifting and moving pallets, the device comprising a framework, two substantially parallel forks projecting forwardly from the framework, each fork having a top surface adapted to be in contact with the pallet, a handle connected to the framework for applying manual force to the framework, and support members connected to the framework for supporting the framework from the ground.

PRIOR ART

A device for lifting and moving pallets is called a pallet jack, a pallet truck, pump truck, or jigger. A manual pallet jack is called a hand-powered or hand-operated jack. A pallet jack is a truck used for moving pallets in the industry, trade or distribution of goods. A traditional hand-operated pallet jack is provided with two parallel forks, which are supported by wheels at its rear and front swivel part. The pallet jack is hydraulically raised and lowered by a pull handle, which is manually lowered and raised. The front wheels are mounted inside the end of the forks, and as the hydraulic jack is raised, the forks are separated vertically from the front wheels, forcing the load upward until it clears the floor. The pallet is only lifted enough to clear the floor for subsequent travel.

U.S. Pat. No. 3,982,767 discloses an example of a hand-operated pallet jack having a combined wheel and jack assembly rotatable about a vertical axis and movable on a steerable wheel, a lift fork raisable and lowerable relative to the assembly by means of a hydraulic jack, support wheels raisable and lowerable in said lift fork. The wheel and jack assembly is carrying a bar for pulling the truck. The bar comprising pumping means for raising the jack. The bar being pivotally mounted on the wheel and jack assembly.

The traditional hand-operated pallet jacks have some disadvantages such as that they are heavy, bulky and difficult to maneuver. It is often a desire to transport a pallet jack together with the goods loaded on the pallets. However, this is often a problem due to the limited loading capacity of the vehicle carrying out the transportation of the goods.

CA101758845 discloses a foldable lightweight hand pallet truck. The pallet truck is provided with a hinge portion of the forks, which can fold upwardly from an operating position to a storage position. The folded truck can thus be readily transported and stored so that it can be made available for use at different locations, for example, by storage within a cab of a truck.

OBJECT AND SUMMARY OF THE INVENTION

It is an object of the present invention to at least partly overcome the above problems, and to provide an improved hand-operated device for lifting and moving pallets.

This object is achieved by a device as defined in claim 1.

The invention is characterized in that the framework comprises a first leg having an upper end operatively connected to the handle and a lower end connected to a first of said forks to form a first frame element, and a second leg having an upper end operatively connected to the handle and a lower end connected to a second of said forks to form a second frame element, wherein each of the first and second frame elements is arranged pivotable about an axis in parallel with the longitudinal axis of the respective fork such that the framework is allowed to pivot between a first position for transporting the pallet and a second position for positioning the forks under the pallet, and the forks and support members are designed such that the vertical distance between the highest point of the top surface of the forks and the lowest point of the corresponding support members is shorter in the second position than in the first position, and by that the fork and the support member of each frame element form a lever for lifting and lowering the pallet.

The pallet is lifted and lowered relative the ground by means of a pivotal movement of the frame elements. The forks are moved to a position under the pallet when the device is in the second position, and the pallet is lifted by pivoting the frame elements to the first position, thereby causing a vertical movement of the pallet. The pallet can be horizontally moved when the framework is in the first position. The pallet is lowered by pivoting the frame elements to the second position. When the framework is in the second position, the forks can be moved away from under the pallet. The forks and support members form a lever for lifting and lowering the pallet, and the rods form an extension of the lever to facilitate the movements. A manually actuating handle is connected to the rods for effecting the pivotal movements of the framework by manual applying a torque to the lever.

The device according to the invention does not need a hydraulic pump for effecting vertical movements of the pallet. The device according to the invention is less complex, easier to manufacture, and accordingly less costly, than a traditional hand pallet truck. Further, the device according to the invention is smaller, lighter, easier to maneuver, weigh less, and takes less space compared to a traditional hand pallet truck.

To achieve the lever, the forks and support members are designed such that the vertical distance between the highest point of the top surface of the forks and the lowest point of the corresponding support members is shorter in the second position than in the first position. This means that the high of the forks and corresponding support members should be larger than the width of the forks and corresponding support members.

According to an embodiment of the invention, the frame elements are arranged in parallel and the distance between said legs is smaller in the second position than in the first position. This means that the device is thinner and accordingly occupies less space when the frame elements are in the second position then in the first position. Thus it is advantageous to store the device when it is in the second position.

Each leg is connected to the corresponding fork so that the leg is aligned with the lever to form an extended lever between the handle and the support members. Preferably, each leg is connected to the corresponding fork so as to form an L-shaped frame element.

According to an embodiment of the invention, the support members are wheels, each frame element is provided with a front wheel and a rear wheel, and at least one of the wheels are pivotally mounted. Preferably, each frame element is provided with at least two pivotally mounted wheels. By providing the frame element with two pivotally mounted wheels it is possible to move the device in different directions relative the longitudinal axis of the forks. Thus, it is possible to move the device in the direction aligned with the longitudinal axis of the forks as well as in a direction perpendicular to the longitudinal axis of the forks. This is advantageous, for example, when the pallet is to be moved through a narrow opening, such as a door opening.

According to an embodiment of the invention, the handle is pivotally connected to the first and second legs. This embodiment enables the handle to pivot at the same time as the frame elements pivot.

According to an embodiment of the invention, the handle is pivotally connected to the first leg about an axis parallel to a longitudinal axis of the first fork and the handle is pivotally connected to the second leg about an axis parallel to a longitudinal axis of the second fork.

According to an embodiment of the invention, the handle comprises a first and a second distance element arranged in parallel and at a distance from each other, and a main handle part connected between the first and a second distance elements, and the first distance element is pivotally connected to the first leg about an axis parallel to the longitudinal axis of the first fork, and the second distance element is pivotally connected to the second leg about an axis parallel to the longitudinal axis of the second fork. This embodiment makes it possible to keep the handle essentially horizontal when the frame elements are pivoted between the first and second position, which facilitated the use of the device.

According to an embodiment of the invention, the device is provided with locking means adapted to removably lock the handle in a fixed position relative to the legs. When the device has lifted the pallet from the ground and the device is used to move the pallet, it is advantageous to lock the handle in a fixed position relative to the legs in order to stabilize the device.

According to an embodiment of the invention, the framework comprises a frame part having one end pivotally connected to a lower portion of the first leg and the other end pivotally connected to a lower portion of the second leg. The frame part further stabilizes the device.

According to an embodiment of the invention, said frame part is a rod having one end pivotally connected to the first leg about an axis parallel to a longitudinal axis of the first fork and the other end is pivotally connected to the second leg about an axis parallel to a longitudinal axis of the second fork.

According to an embodiment of the invention, the forks are arranged with an adjustable length. This embodiment makes it possible to adjust the length of the forks to adapt to the length or width of the pallet.

According to an embodiment of the invention, the device according to any of the previous claims, wherein each fork is elongated and has two long sides neighboring the top surface, and at least one of the long sides are provided with support elements in order to facilitate the movements of the pallet carrier when it is in the folded position and to prevent the floor from being scratched.

According to an embodiment of the invention, each of the forks are provided with at least two support wheels arranged with their rotational axes perpendicular to the rotational axes of the front and rear wheels, and connected to a long side neighboring the top surface of the fork. The support wheels facilitate to move the forks under the pallet when the frame elements are in the second position.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
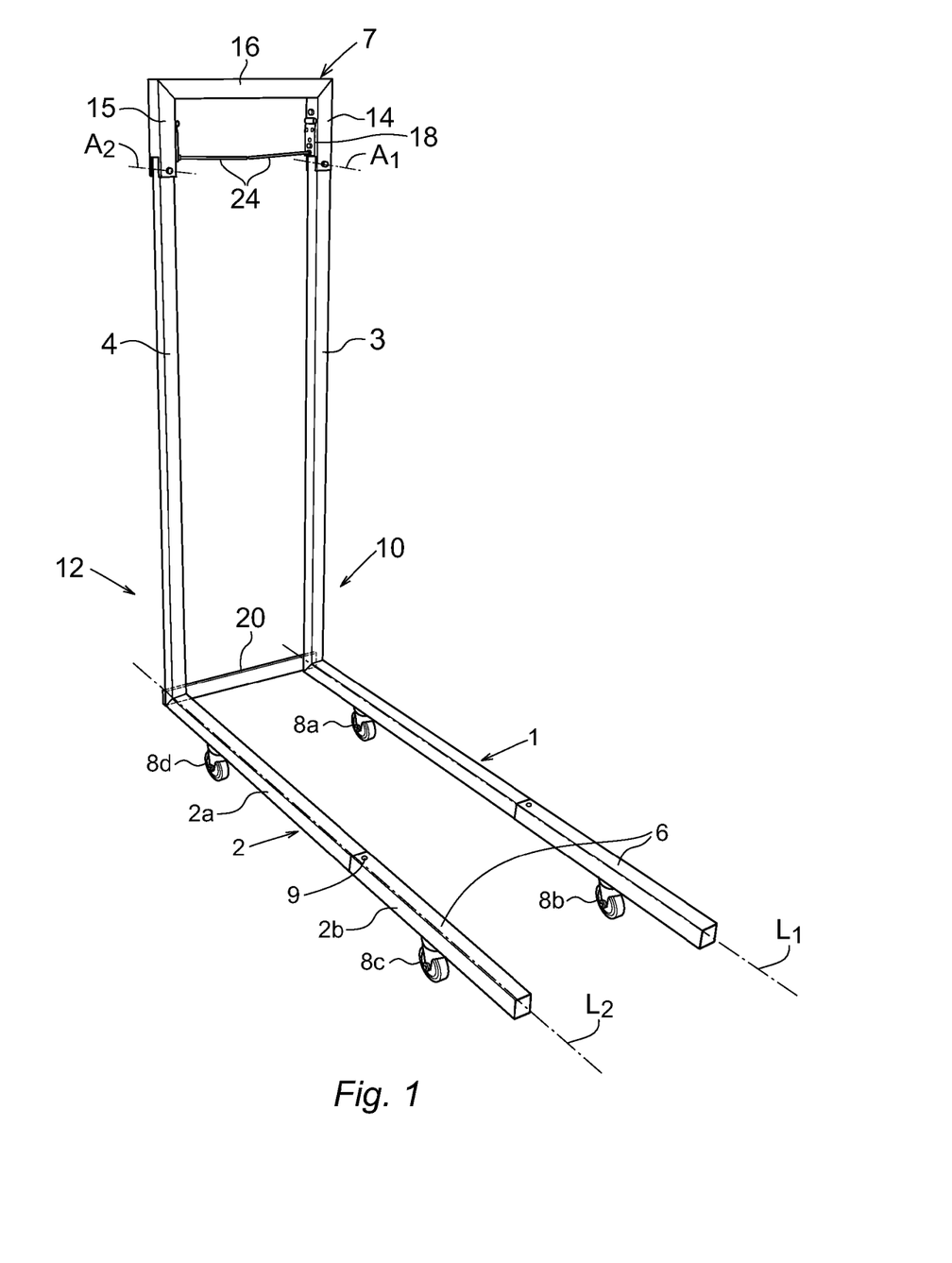
FIG. 1 shows a perspective view of a hand-operated device for lifting and moving pallets according to an embodiment of the invention in an upright position.

FIG. 1 shows a perspective view of a hand-operated device for lifting and moving pallets, in the following denoted a pallet carrier, according to an embodiment of the invention. The pallet carrier comprises a framework including a first and a second frame element 10, 12. The frame elements include a first and a second substantially parallel fork 1, 2 and a first and a second leg 3, 4 connected to the forks. Each of the frame elements 10, 12 comprises a leg 3, 4 and a fork 1, 2 extending away from the leg. Each fork has a top surface 6, a bottom surface, two opposite long sides and two opposite short sides. The top surfaces 6 are adapted to be in contact with a pallet during operation of the pallet carrier. The pallet carrier comprises a handle 7 connected to the framework for applying manual force to the framework, and support members 8a-d connected to the framework for supporting the framework from ground. The first leg 3 has an upper end operatively connected to the handle 7 and a lower end connected to the first fork 1 to form the first frame element 10. The second leg 4 has an upper end operatively connected to the handle 7 and a lower end connected to the second fork 2 to form the second frame element 12. Each of the first and second frame elements 10, 12 is arranged pivotable about an axis in parallel with the longitudinal axis $L_1$, $L_2$ of the respective fork.

The forks are, for example, made of beams. The beams can be solid or hollow. A hollow beam weighs less than a solid beam, and accordingly reduces the weight of the pallet carrier. Preferably, the forks are made of metal such as iron or steel. Preferably, the forks have a substantially rectangular cross-section. In this embodiment, the forks have a substantially square cross-section. Optionally, the forks have an adjustable length. In this embodiment, each fork includes two parts; a fixed part 2a connected to the leg and a movable part 2b. The movable part 2b is hollow and designed to enclose an outer end of the fixed part 2a. The movable part 2b is movable in the longitudinal direction $L_2$ of the fork and by that it is possible to adjust the length of the fork. The forks include a locking mechanism 9 arranged to lock the movable part 2b in a fixed relation to the fixed part 2a and thereby to freeze the length of the fork 2.

The legs 3, 4 are elongated and connected to the forks 1, 2 so that the legs protrude upwardly from the forks. In this embodiment, the legs 3, 4 are connected to the forks 1, 2 so as to form L-shaped frame elements 10, 12, i.e. the legs are arranged substantially perpendicular to the forks. However, it is possible to arrange the frame elements so that the angle between the leg and the fork is more than 90°. In this embodiment, the legs 3, 4 are made of hollow metal beams. However, the legs are preferably made of a light weight material, such as fiberglass, carbon fibers, or a polymer material. In this embodiment, the legs are fixedly connected to the forks. However, in another embodiment the forks can be foldably connected to the legs, to allow the forks to be fold upwardly from an operating position to a storage position. However, during operation of the pallet carrier, the forks should be fixed in relation to the legs. The two L-shaped frame elements are supported by wheels 8a-d at its rear and front part.

The function of the support members is to reduce friction and accordingly to facilitate movement of the pallet carrier. The support members are, for example, wheels, skids, or runners. In the embodiment, shown in FIG. 1, each frame elements 10, 12 are provided with a front wheel 8b, 8c and rear wheel 8a, 8d. The wheels have rotational axes in parallel with a plane formed by the longitudinal axis $L_1$, $L_2$ of the forks. The wheels 8a-d are pivotally mounted about an axis perpendicular to the plane formed by the longitudinal axis $L_1$, $L_2$ of the forks. It is advantageous to have all the wheels pivotally mounted since that makes it possible to move the pallet carrier in all directions. In an alternative embodiment the front wheels, or the rear wheels can be fixedly mounted. However, in such case the forks have to be redesigned.

One end of the handle 7 is pivotally connected to the first leg 3 about an axis $A_1$ parallel to the longitudinal axis $L_1$ of the first fork 1, and the other end of the handle 7 is pivotally connected to the second leg 4 about an axis $A_2$ parallel to the longitudinal axis $L_2$ of the second fork 2. The handle 7 comprises a first and a second distance element 14, 15 arranged in parallel and at a distance from each other, and a main handle part 16 connected between the first and second distance elements 14, 15. The first distance element 14 is pivotally connected to the first leg 3 about the axis $A_1$, and the second distance element 15 is pivotally connected to the second leg 4 about the axis $A_2$. The handle 7 is provided with a locking mechanism 18 adapted to removably lock the handle 7 in a fixed position relative to the legs 3, 4. The locking mechanism 18 is arranged so that the frame elements 10, 12 are prevented from pivoting when the locking mechanism is locked and the frame elements are allowed to pivot when the locking mechanism is unlocked. The locking mechanism includes two actuating pins 24. Thus, by actuating the locking mechanism a user can choose between allowing the frame elements to pivot and preventing them from pivoting. Preferably, the locking mechanism is designed such that it is possible for a user to actuate the locking mechanism and at the same time hold the handle. The locking mechanism 18 is shown in more details in FIG. 6.

Optionally, the framework comprises a frame part 20, for example in the form of a rod, connected between the first and second frame elements 10, 12. The function of the frame part 20 is to keep the forks is a fixed relation and to stabilize the pallet carrier. The frame part 20 has one end pivotally connected to a lower portion the first leg 3 about an axis parallel to the longitudinal axis $L_1$ of the first fork, and the other end pivotally connected to a lower portion the second leg 4 about an axis parallel to the longitudinal axis $L_2$ of the second fork.

Figure 2:
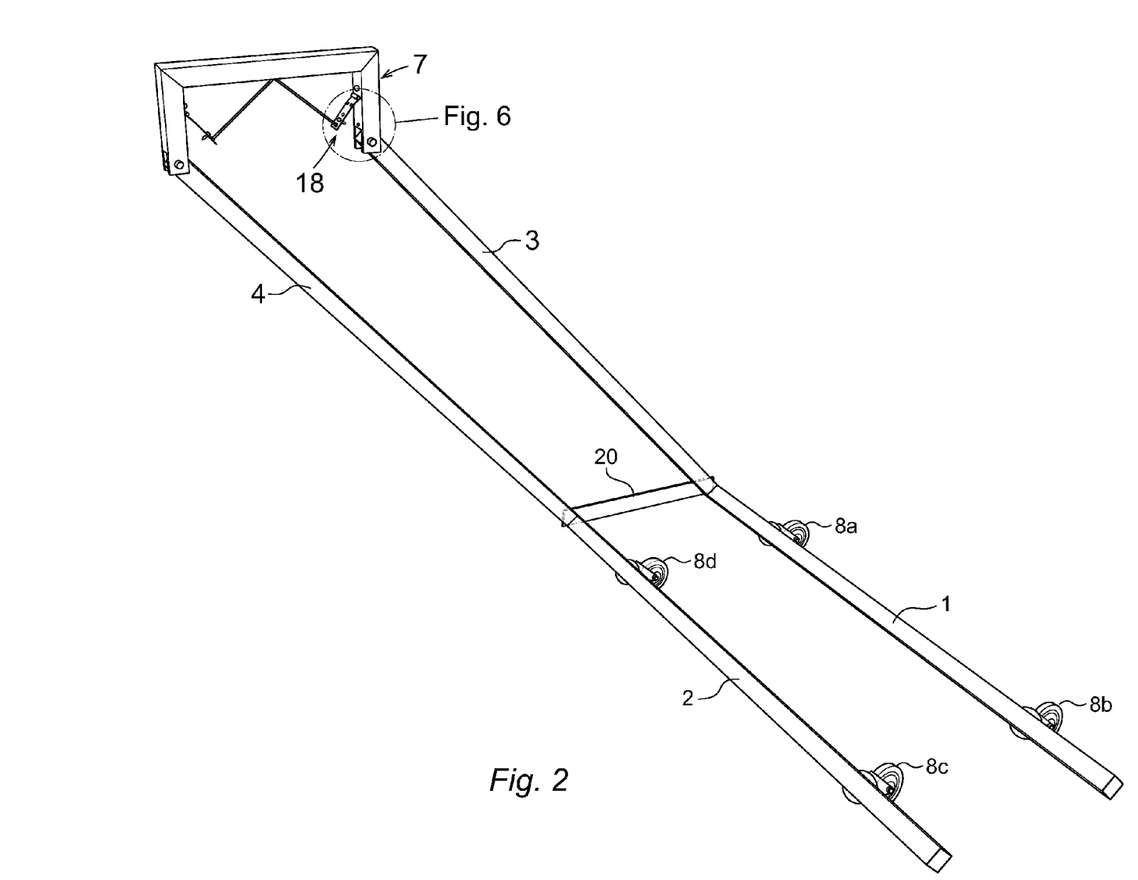
FIG. 2 shows the device in FIG. 1 in an inclined position.
Figure 3:
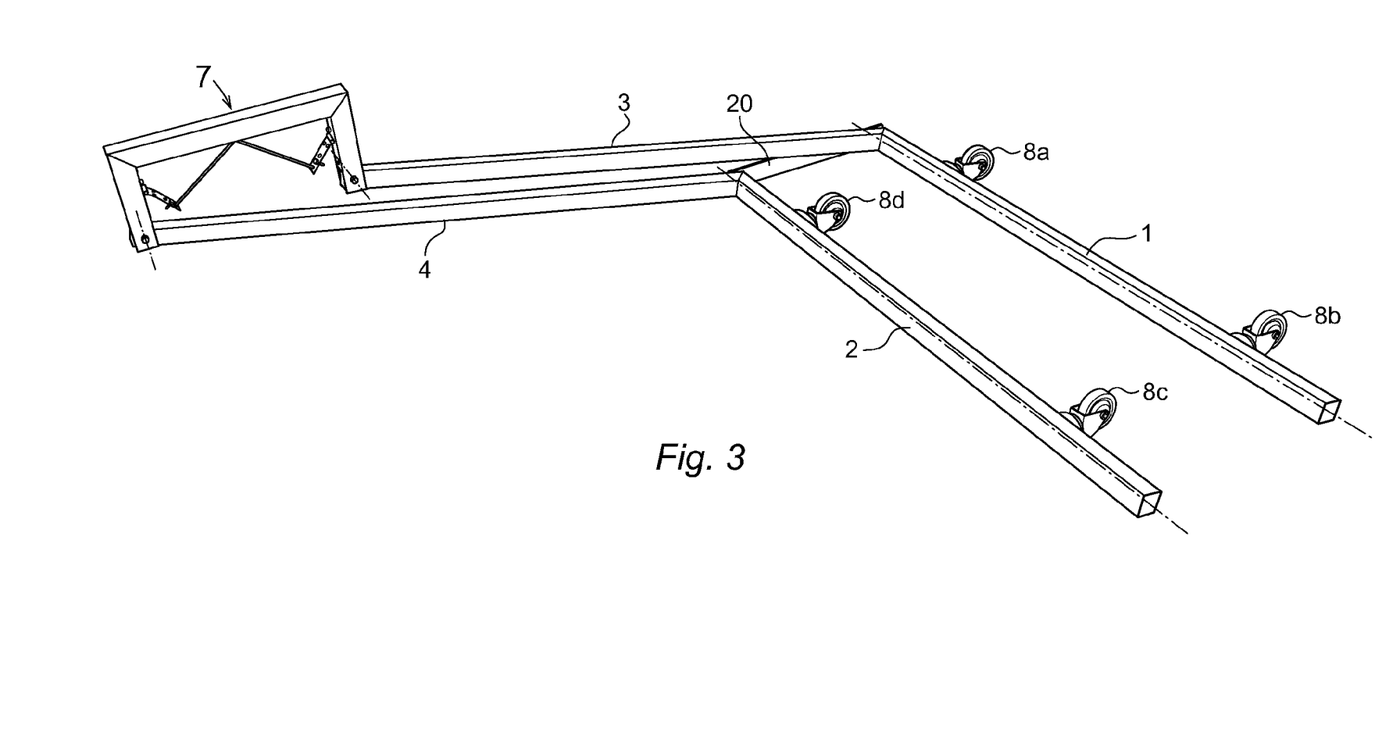
FIG. 3 shows the device in FIGS. 1 and 2 in a folded position.
Figure 4:
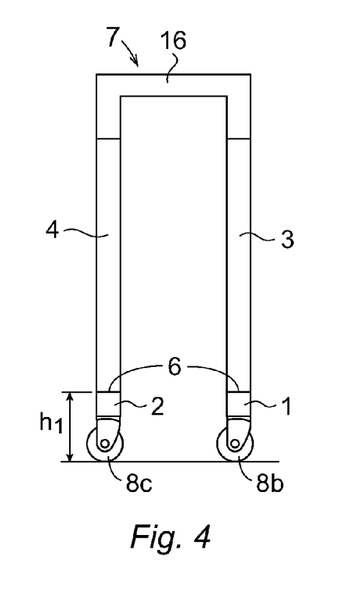
FIG. 4 shows a front view of the device in the upright position.
Figure 5:
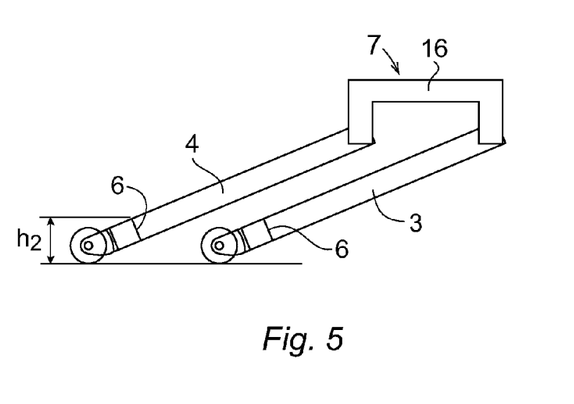
FIG. 5 shows a front view of the device in the folded position.

The pallet carrier according to the invention is pivotable between an upright position, an inclined position and a folded position as shown in FIGS. 1-3. FIG. 1 shows the pallet carrier in an upright position used for transportation of a pallet. FIG. 2 shows the pallet carrier in an inclined position. FIG. 3 shows the pallet carrier in a folded position used for positioning the forks under the pallet. The pallet carrier can be folded to the right side as well as to the left side. FIG. 4 shows a front view of the pallet carrier in the upright position and FIG. 5 shows a front view of the pallet carrier in the folded position. The frame elements 10, 12 are arranged in parallel and the distance between said legs 3, 4 is smaller in the folded position than in the upright position, as shown in FIGS. 4 and 5. Thus, the pallet carrier is thinner in the folded position and accordingly occupies less space. It is advantageous to store the pallet carrier in the folded position when the pallet carrier is not used.

The forks 1, 2 and the support members 8a-d are designed such that the vertical distance between the highest point of the top surface 6 of the forks and the lowest point of the corresponding support members 8a-d is shorter in the folded position than in the upright position, and by that the fork and the support member of each frame element form a lever for lifting and lowering the pallet. The lowest points of the support members 8a-d are the points being in contact with the ground. As seen from FIGS. 4 and 5, the vertical distance $h_1$ between the top surface 6 of the forks 1, 2 and ground in the upright position is higher than the vertical distance $h_2$ between the highest point of the top surface 6 and ground in the folded position, i. e. $h_1 > h_2$. The vertical distance $h_2$ must be shorter than the distance between ground and the underneath of the pallet, so that it is possible to slide the forks under the pallet when the pallet carrier is in the folded position. Further, the vertical distance $h_1$ must be larger than the distance between ground and the underneath of the pallet, so that it is possible to lift the pallet from the ground when the pallet carrier is pivoted from the folded position to the upright position. As seen from FIGS. 4 and 5, the handle 7 is arranged so that the main handle part 16 is kept substantially horizontal when the pallet carrier is pivoted between the upright and folded position.

Figure 6:
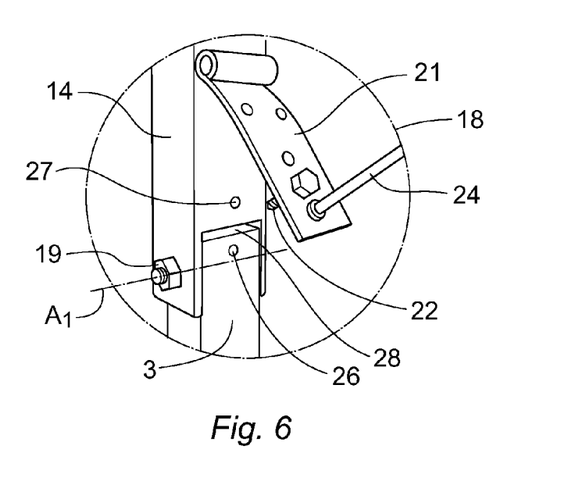
FIG. 6 shows a locking mechanism of the device in more details.

FIG. 6 shows the locking mechanism 18 in more details. The distance element 14 is connected to the leg 3 by means of a bolting 19. The bolting 19 is positioned in an elongated hole (not shown) in the leg extending in the longitudinal axis of the leg to allow the bolting and accordingly the handle to be moved relative the leg in the longitudinal direction of the leg 3. The locking mechanism 18 includes a pivotable member 21 connected to the distance element 14 and provided with a protruding part 22 and an actuating pin 24 to be actuated by the user upon unlocking of the locking mechanism. The distance element 14 and the leg 3 are provided with corresponding holes 26, 27. When the handle is locked, as shown in FIG. 1, the holes 26 and 27 are aligned and the protruding part 22 is inserted in the holes. To unlock the locking mechanism and allow the handle to pivot, the user pushes the actuator pin upwards and by that moves the pivotable member 21 away from the leg and accordingly the protruding part 22 is removed from the holes 26, 27. Now it is possible for the user to move the handle 7 upwards relative the leg to form a slot 28 between the distance element 14 and the leg 3 and by that allow the distance element 14 to rotate about the longitudinal axis $A_1$ of the bolting 19. Thus, by actuating the actuating pins 24 upwards a user can unlock the handle from the frame elements, and allow the frame elements to pivot, and by actuating the actuating pins 24 downwards the user can lock the position of the handle relative the frame elements and preventing the frame elements from pivoting.

Figure 7A:
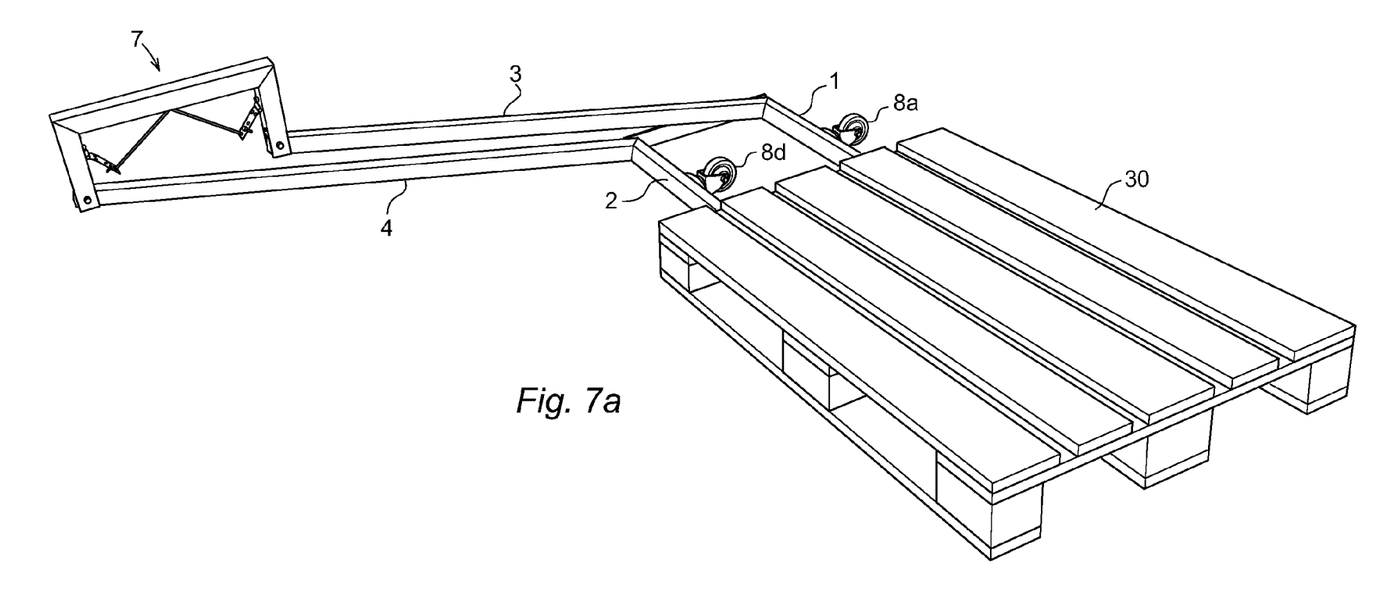
FIGS. 7a-c illustrates the use of the device for lifting and moving a pallet.
Figure 7B:
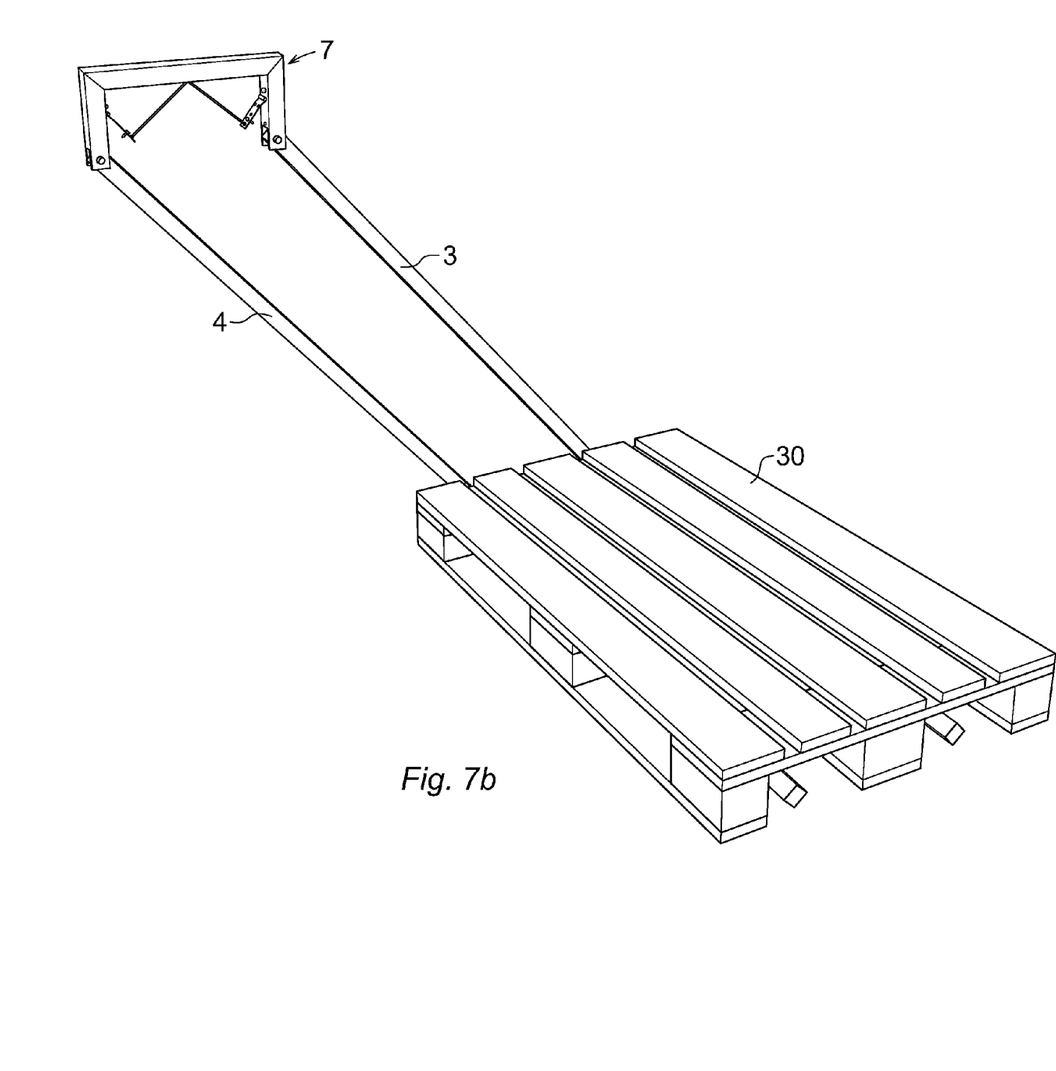
Figure 7C:
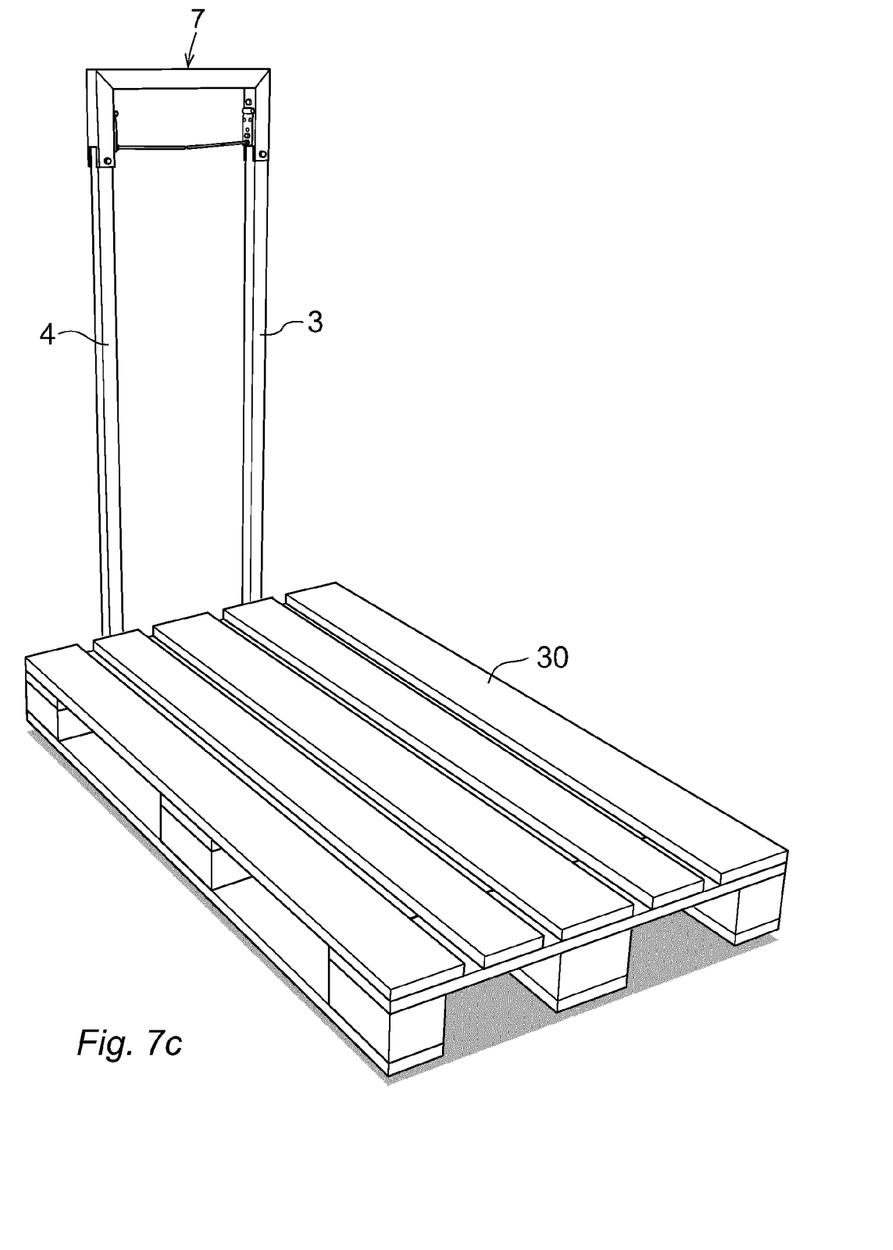

FIG. 7*a-c* illustrates the use of the pallet carrier for lifting and moving a pallet 30. In a first step, the carrier is in the upright position, as shown in FIG. 1. The handle 7 is unlocked by actuating the actuating pins 24, as shown in FIG. 6, to allow pivoting of the frame elements. In a second step, the pallet carrier is pivoted to the folded position as shown in FIGS. 2 and 3. As seen from the FIGS. 1-3, the wheels 8*a-d* are pivoted relative the forks when the pallet carrier is pivoted from the upright position to the folded position. In a third step, the pallet carrier is moved under a pallet 30 in the folded position so that the forks 1, 2 extend under the pallet, as shown in FIG. 7*a*. In a forth step, the pallet carrier is pivoted from the folded position to the upright position, as shown in FIGS. 7*a-c* and by that the pallet 30 is lifted from the ground due to the movements of the lever formed by the wheels 8*a-d* and the forks 1, 2. In a last step, the pallet carrier is in the upright position and the handle 7 is locked by actuating the actuating pins 24 to prevent the frame elements from pivoting, as shown in FIG. 7*c*. Now the pallet carrier is ready to move the pallet. Due to the pivotable wheels it is possible to move the pallet in a forward direction, i.e. in the longitudinal direction of the forks, as well as laterally, i.e. in a direction perpendicular to the longitudinal direction of the forks.

Figure 8:
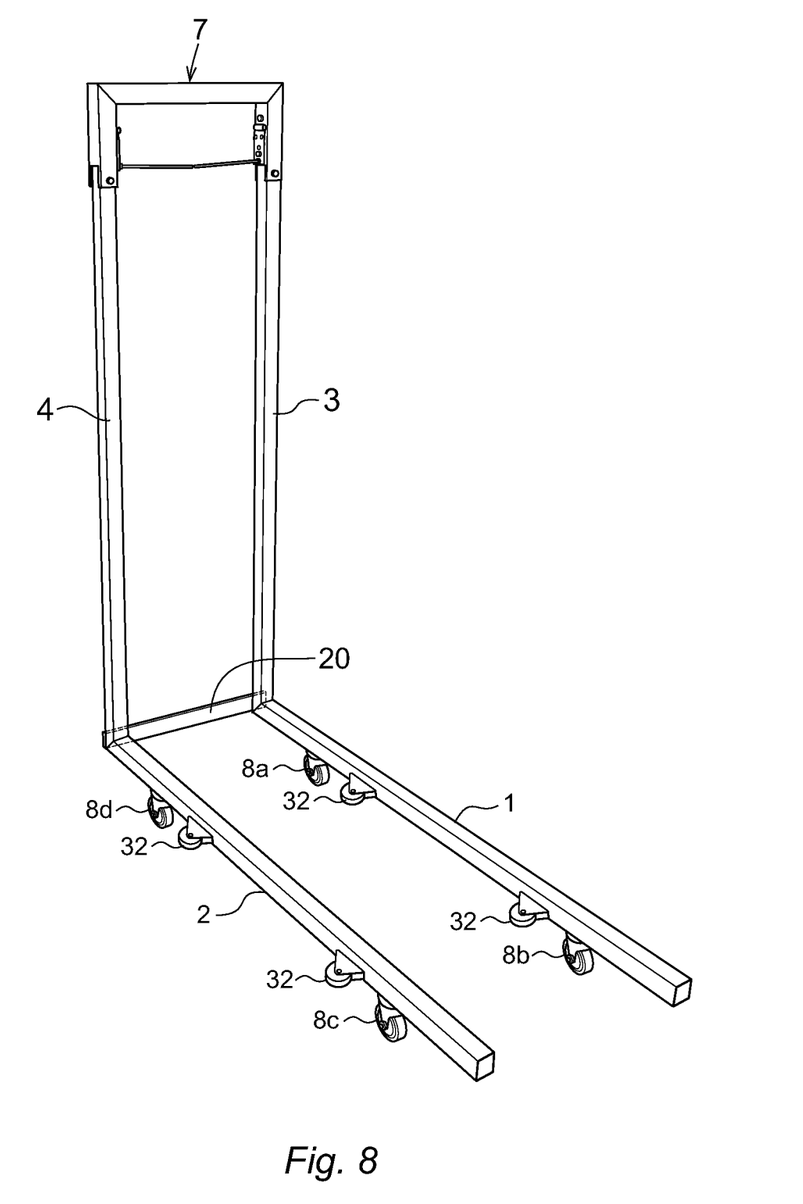
FIG. 8 shows a hand-operated device for lifting and moving pallets according to a second embodiment of the invention.

FIG. 8 shows a pallet carrier for lifting and moving pallets according to a second embodiment of the invention. The pallet carrier according to the second embodiment of the invention differs from the pallet carrier in the first embodiment in that the long sides of the forks are provided with support elements 32 in order to facilitate the movements of the pallet carrier when it is in the folded position and prevent the floor from being scratched. The support elements are, for example, pads made of a low friction material attached to the long sides of the forks, or support wheels 32 arranged with their rotational axes perpendicular to the rotational axes of the support members 8*a-d* arranged on the bottom surface of the forks. Preferably, at least one of the long sides of each fork is provided with a support element. More preferably, both long sides of each fork is provided with one or more support members to facilitate the movements of the pallet carrier when it is folded to the right side as well as to the left side. In the embodiment of the invention shown in FIG. 8, each fork are provided with two support wheels 32 on each long side. The support wheels 32 are arranged with their rotational axes perpendicular to the rotational axes of the front and rear wheels 8*a-d*, and connected to the long side. The support elements 32 are arranged to be in contact with the ground when the forks are moved in the folded position in order to facilitate the movement of the pallet carrier when it is in the folded position.

Figure 9:
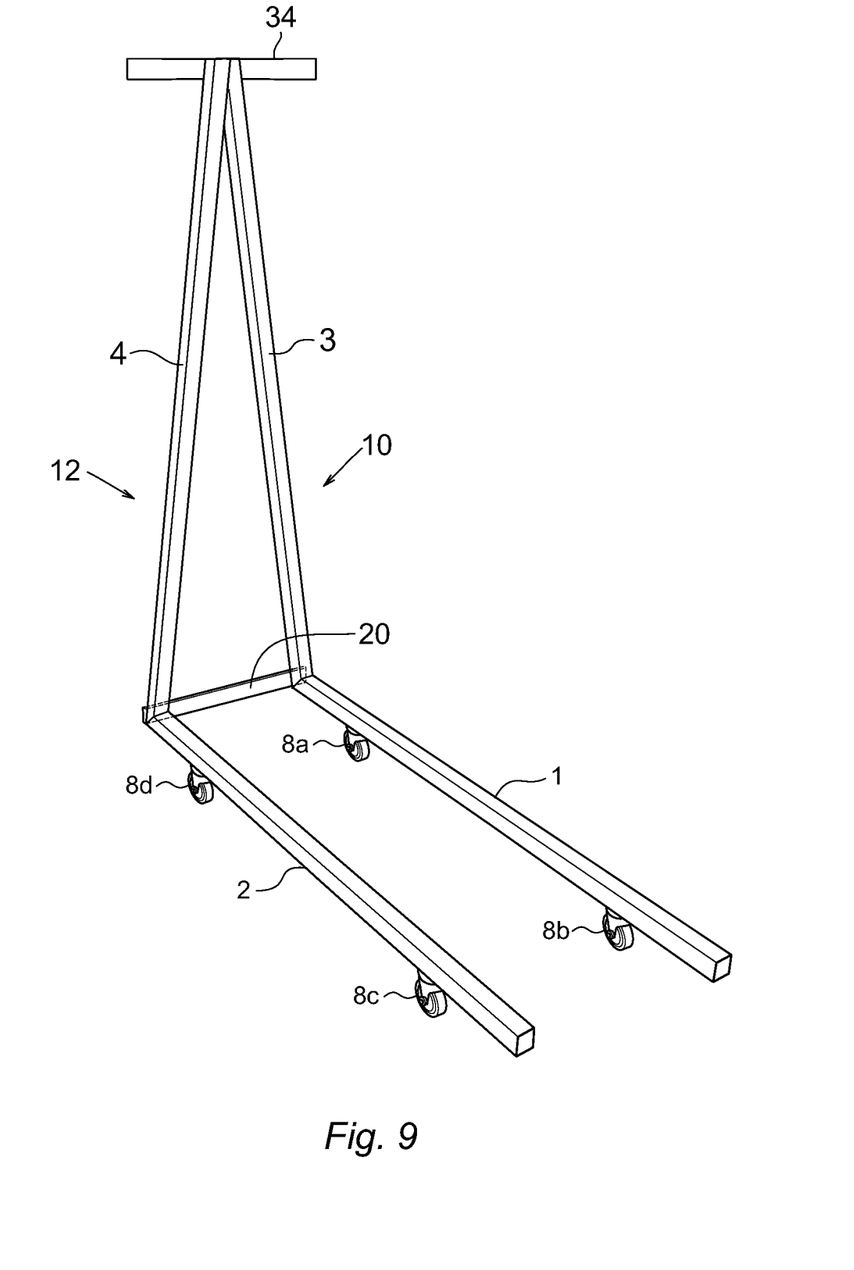
FIG. 9 shows a hand-operated device for lifting and moving pallets according to a third embodiment of the invention.

FIG. 9 shows a hand-operated device for lifting and moving pallets according to a third embodiment of the invention when the device is in an upright position. The frame elements 10, 12 are attached to form a V, turned upside down. The frame elements 10, 12 are detached from each other to be in parallel before the frame elements are pivoted. The device includes a handle 34.

The present invention is not limited to the embodiments disclosed but may be varied and modified within the scope of the following claims. For example, alternative locking mechanisms can be used. The support member can be skids.

The invention claimed is:

1. A hand-operated device for lifting and moving pallets, the device comprising:
a framework including a first and a second fork projecting forwardly from the framework, each fork having a top surface adapted to be in contact with the pallet and a bottom surface,
a handle connected to the framework for applying manual force to the framework for moving the device, and
support members fixedly attached to the bottom surface of the forks for supporting the framework from the ground, wherein the framework comprises a first leg having an upper end operatively connected to the handle and a lower end fixedly connected to the first fork so that the first leg and the first fork form a first frame element, and a second leg having an upper end operatively connected to the handle and a lower end fixedly connected to the second fork so that the second leg and the second fork form a second frame element, wherein each of the first and second frame elements is arranged pivotable about an axis in parallel with the longitudinal axis ($L_1$, $L_2$) of the respective fork such that the framework is allowed to pivot between a first position for transporting the pallet and a second position for positioning the forks under the pallet, and the forks and support members are designed such that the vertical distance ($h_1$, $h_2$) between the highest point of the top surface of the forks and the lowest point of the corresponding support members is shorter in the second position than in the first position, and by that the fork and the support member of each frame element form a lever for lifting and lowering the pallet.

2. The device according to claim 1, wherein each leg is connected to the corresponding fork so as to form an L-shaped frame element.

3. The device according to claim 1, wherein the support members are wheels, each frame element is provided with a front wheel and rear wheel, and at least the front wheels are pivotally mounted.

4. The device according to claim 3, wherein each frame element is provided with at least two pivotally mounted wheels.

5. The device according to claim 1, wherein the handle is pivotally connected to the first and second legs.

6. The device according to claim 5, wherein the handle is pivotally connected to the first leg about an axis ($A_1$) parallel to a longitudinal ($L_1$) axis of the first fork and the handle is pivotally connected to the second leg about an axis ($A_2$) parallel to a longitudinal axis ($L_2$) of the second fork.

7. The device according to claim 6, wherein the handle comprises a first and a second distance element arranged in parallel and at a distance from each other, and a main handle part connected between the first and a second distance elements, and the first distance element is pivotally connected to the first leg about an axis ($A_1$) parallel to the longitudinal axis ($L_1$) of the first fork, and the second distance element is pivotally connected to the second leg about an axis ($A_2$) parallel to the longitudinal axis ($L_2$) of the second fork.

8. The device according to claim 5, wherein the device is provided with a locking mechanism adapted to removably lock the handle in a fixed position relative to the legs.

9. The device according to claim 1, wherein the framework comprises a frame part having one end pivotally connected to a lower portion the first leg and the other end pivotally connected to a lower portion the second leg.

10. The device according to claim 9, wherein said frame part is elongated and have one end pivotally connected to the first leg about an axis parallel to a longitudinal axis ($L_1$) of the first fork and the other end pivotally connected to the second leg about an axis parallel to a longitudinal axis ($L_2$) of the second fork.

11. The device according to claim 1, wherein the frame elements are arranged in parallel and the distance between said legs is smaller in the second position than in the first position.

12. The device according to claim 1, wherein each of the forks are arranged with an adjustable length.

13. The device according to claim 1, wherein each fork is elongated and has two long sides neighboring the top surface, and at least one of the long sides are provided with support elements in order to facilitate the movements of the pallet carrier when it is in the folded position.

14. The device according to claim 3, wherein each of the forks are provided with at least two support wheels arranged with their rotational axes perpendicular to the rotational axes of the front and rear wheels, and connected to a long side neighboring to the top surface of the fork.

15. The device according to claim 13, wherein each of the forks are provided with at least two support wheels arranged with their rotational axes perpendicular to the rotational axes of the front and rear wheels, and connected to a long side neighboring to the top surface of the fork.

16. A hand-operated device for lifting and moving pallets, the device comprising:
- a framework including a first and a second fork projecting forwardly from the framework, each fork having a top surface adapted to be in contact with the pallet,
- a handle connected to the framework for applying manual force to the framework, and
- support members connected to the framework for supporting the framework from the ground, wherein the framework comprises a first leg having an upper end operatively connected to the handle and a lower end connected to the first fork to form a first frame element, and a second leg having an upper end operatively connected to the handle and a lower end connected to the second fork to form a second frame element, wherein each of the first and second frame elements is arranged pivotable about an axis in parallel with the longitudinal axis ($L_1$, $L_2$) of the respective fork such that the framework is allowed to pivot between a first position for transporting the pallet and a second position for positioning the forks under the pallet, and the forks and support members are designed such that the vertical distance ($h_1$, $h_2$) between the highest point of the top surface of the forks and the lowest point of the corresponding support members is shorter in the second position than in the first position, and by that the fork and the support member of each frame element form a lever for lifting and lowering the pallet, and
- wherein the handle is pivotally connected to the first leg about an axis ($A_1$) parallel to a longitudinal ($L_1$) axis of the first fork, and the handle is pivotally connected to the second leg about an axis ($A_2$) parallel to a longitudinal axis ($L_2$) of the second fork.

17. A hand-operated device for lifting and moving pallets, the device comprising:
- a framework including a first and a second fork projecting forwardly from the framework, each fork having a top surface adapted to be in contact with the pallet,
- a handle connected to the framework for applying manual force to the framework, and
- support members connected to the framework for supporting the framework from the ground, wherein the framework comprises a first leg having an upper end operatively connected to the handle and a lower end connected to the first fork to form a first frame element, and a second leg having an upper end operatively connected to the handle and a lower end connected to the second fork to form a second frame element, wherein each of the first and second frame elements is arranged pivotable about an axis in parallel with the longitudinal axis ($L_1$, $L_2$) of the respective fork such that the framework is allowed to pivot between a first position for transporting the pallet and a second position for positioning the forks under the pallet, and the forks and support members are designed such that the vertical distance ($h_1$, $h_2$) between the highest point of the top surface of the forks and the lowest point of the corresponding support members is shorter in the second position than in the first position, and by that the fork and the support member of each frame element form a lever for lifting and lowering the pallet, and
- wherein each fork is elongated and has two long sides neighboring the top surface, and at least one of the long sides are provided with support elements in order to facilitate the movements of the pallet carrier when it is in the folded position.

* * * * *